(12) United States Patent
Tamaki

(10) Patent No.: US 11,831,362 B2
(45) Date of Patent: *Nov. 28, 2023

(54) WIRELESS COMMUNICATION SYSTEM

(71) Applicant: CANON KABUSHIKI KAISHA, Tokyo (JP)

(72) Inventor: Hiroto Tamaki, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,427

(22) Filed: Dec. 19, 2022

(65) Prior Publication Data

US 2023/0121661 A1    Apr. 20, 2023

Related U.S. Application Data

(63) Continuation of application No. 17/336,023, filed on Jun. 1, 2021, now Pat. No. 11,558,084, which is a continuation of application No. 16/879,267, filed on May 20, 2020, now Pat. No. 11,057,078.

(30) Foreign Application Priority Data

May 23, 2019  (JP) ................................. 2019-097070
Mar. 4, 2020  (JP) ................................. 2020-037160

(51) Int. Cl.
| | |
|---|---|
| *H04B 5/00* | (2006.01) |
| *H01L 41/107* | (2006.01) |
| *H01L 41/22* | (2013.01) |
| *G02F 1/225* | (2006.01) |

(52) U.S. Cl.
CPC ......... *H04B 5/0075* (2013.01); *H04B 5/0031* (2013.01)

(58) Field of Classification Search
None
See application file for complete search history.

(56) References Cited

U.S. PATENT DOCUMENTS

| | | | | |
|---|---|---|---|---|
| 6,420,842 | B1* | 7/2002 | Gold .................... | H02K 55/04 |
| | | | | 318/141 |
| 8,369,780 | B2* | 2/2013 | Bauer .................... | H04B 5/00 |
| | | | | 307/104 |
| 9,209,570 | B2* | 12/2015 | Toba .................... | H01R 13/648 |
| 9,312,925 | B2* | 4/2016 | Kusaka ................ | H04B 5/0031 |
| 9,699,887 | B2* | 7/2017 | Mizutani .............. | H05K 1/0216 |
| 10,132,653 | B2* | 11/2018 | Rohner ................ | G01D 5/2415 |
| 10,326,499 | B2* | 6/2019 | Yukimasa ............ | H04B 5/0031 |
| 10,371,939 | B2* | 8/2019 | McDonald ......... | G02B 26/0841 |
| 10,558,104 | B2* | 2/2020 | Williams .............. | G02F 1/2255 |
| 10,560,157 | B2* | 2/2020 | Yukimasa ............ | H04B 5/0075 |

(Continued)

*Primary Examiner* — Tuan A Tran

(74) *Attorney, Agent, or Firm* — Canon U.S.A., Inc. IP Division

(57) ABSTRACT

A wireless communication system includes a first coupler having a first pair of electrodes and second coupler having a second pair of electrodes that at least partially oppose the first pair of electrodes. A transmission circuit applies a differential signal to the first coupler. A reception circuit receives a differential signal output from the second coupler based on electromagnetic coupling between the first coupler and the second coupler. A distance between centroids of the first pair of electrodes differs from a distance between centroids of the second pair of electrodes.

15 Claims, 11 Drawing Sheets

(56) References Cited

U.S. PATENT DOCUMENTS

| | | | | |
|---|---|---|---|---|
| 2005/0162240 A1* | 7/2005 | Saitou | ............ | H01P 1/2039 |
| | | | | 333/204 |
| 2013/0134838 A1* | 5/2013 | Yun | ............ | H03H 9/02228 |
| | | | | 29/25.35 |
| 2013/0243106 A1* | 9/2013 | Toba | ............ | H01R 43/26 |
| | | | | 29/874 |

* cited by examiner

FIG. 3A
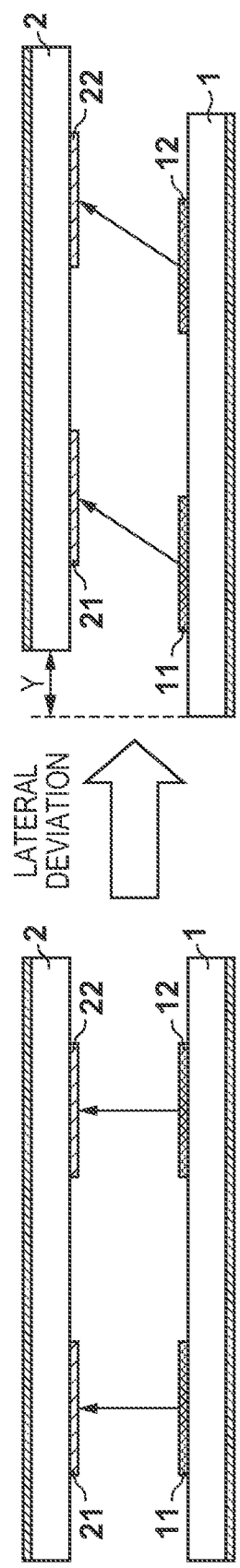
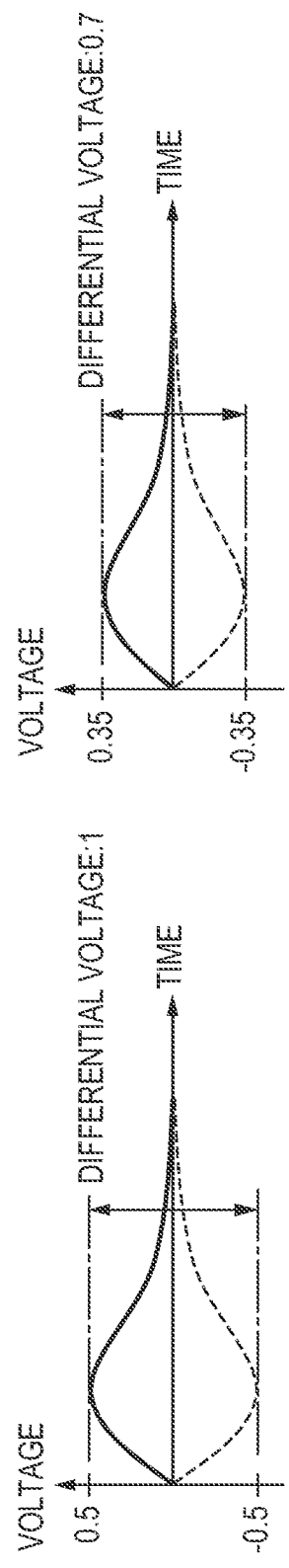

FIG. 3B
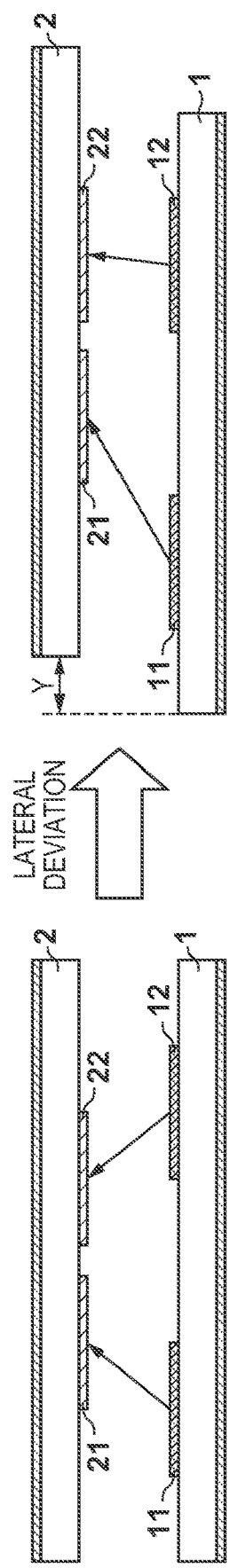
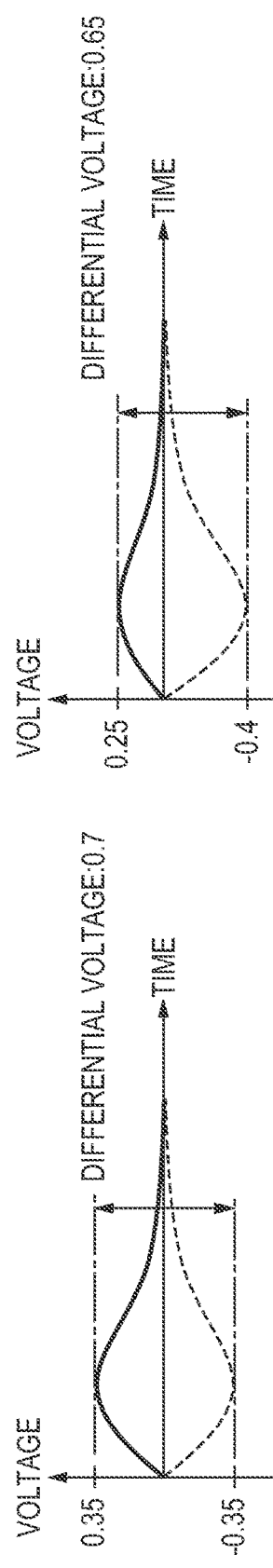

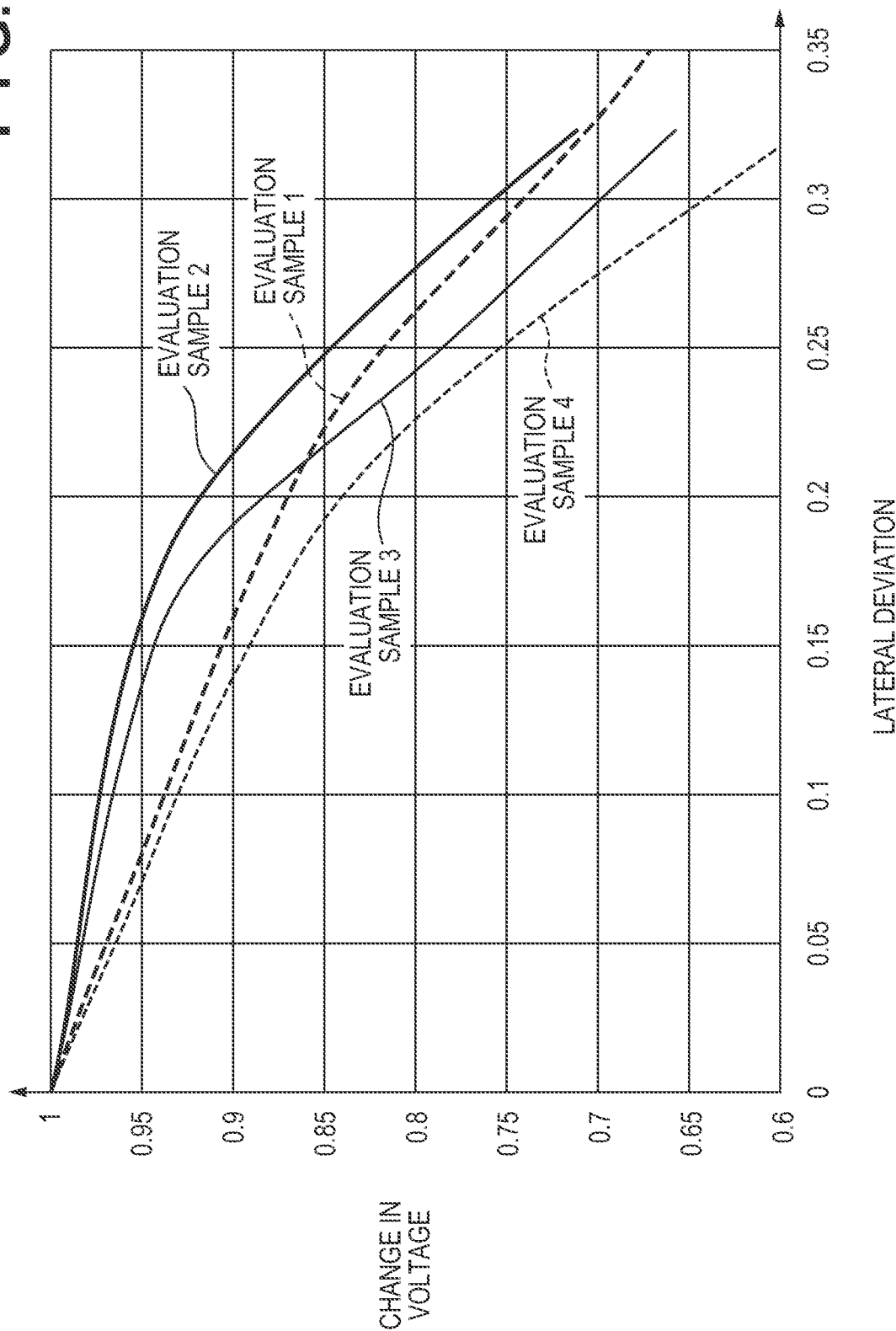

FIG. 9
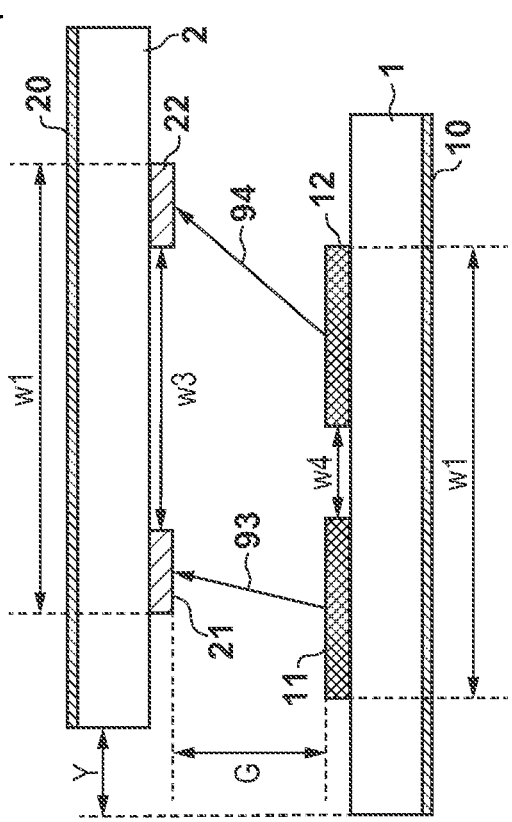
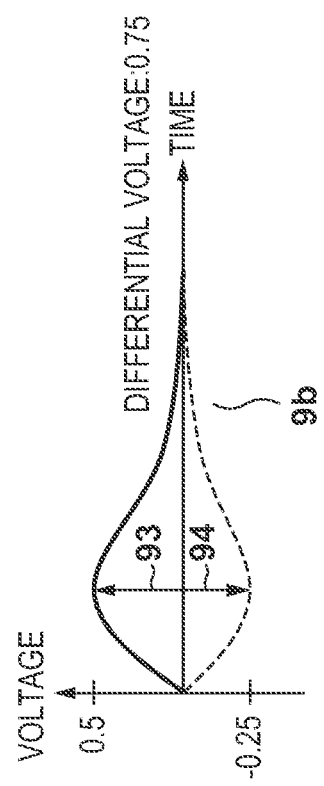
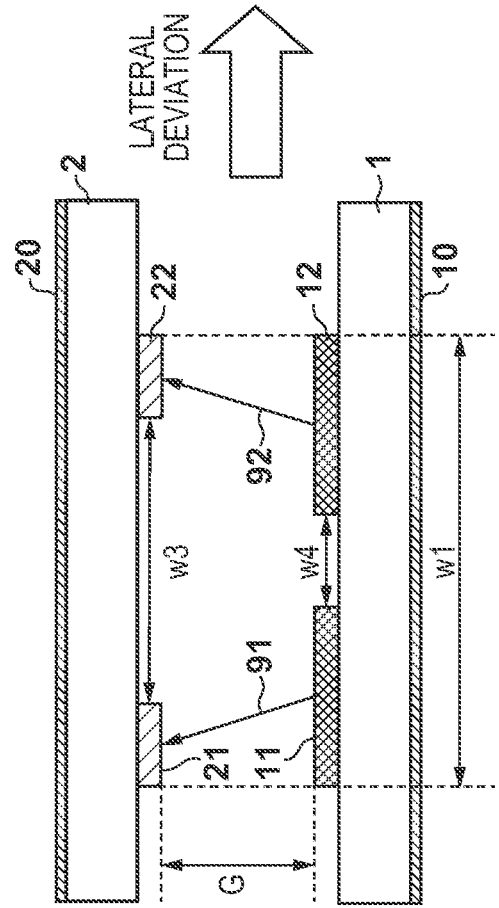
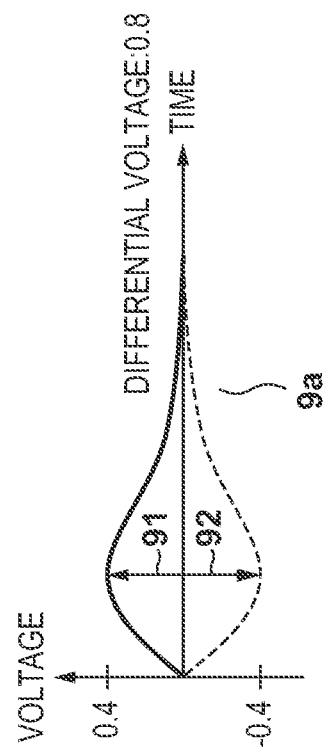

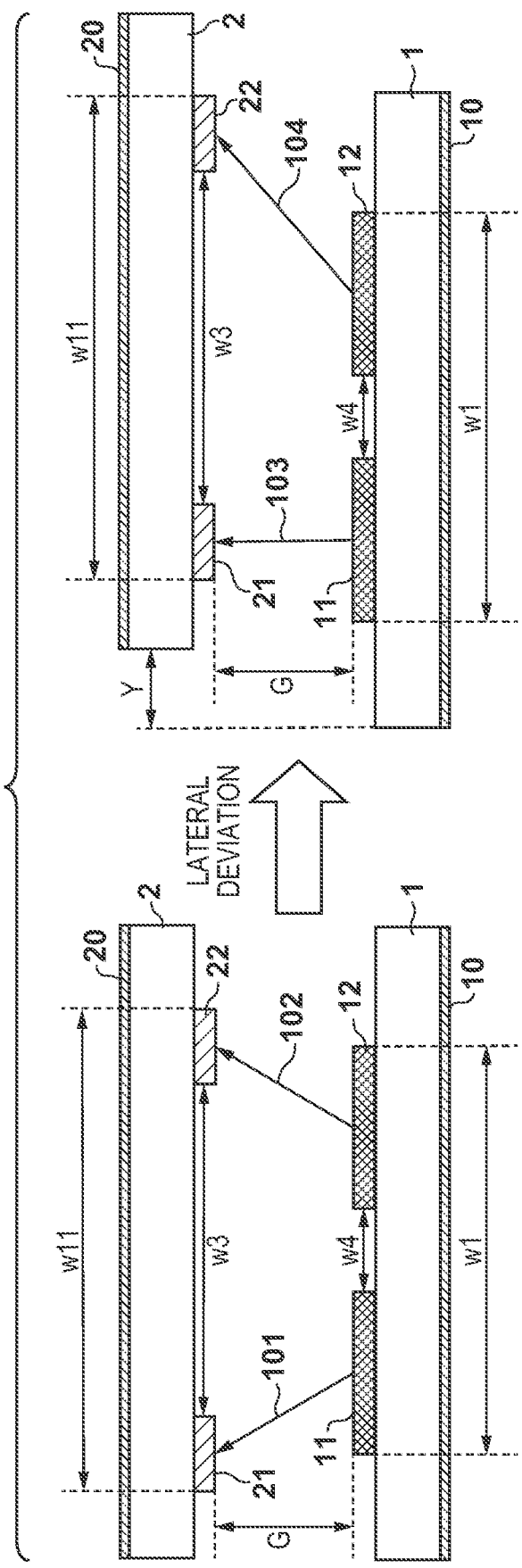
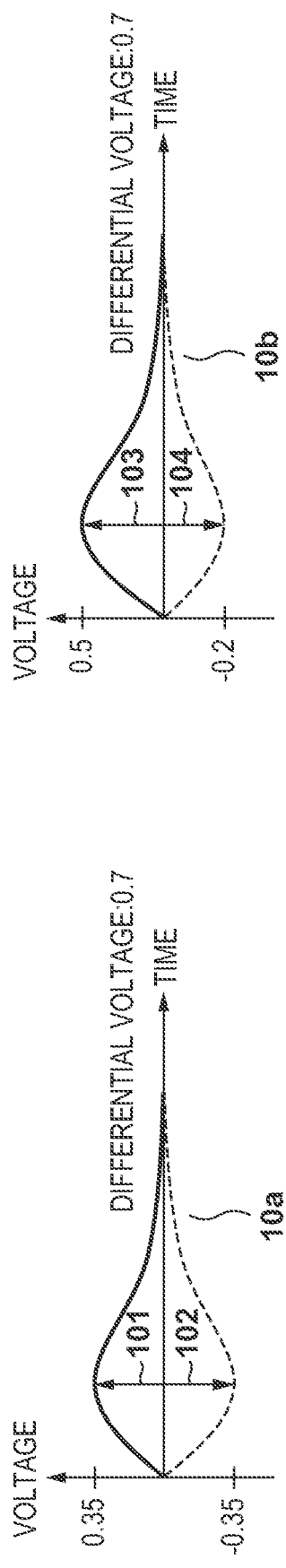
FIG. 10

WIRELESS COMMUNICATION SYSTEM

CROSS-REFERENCE TO RELATED APPLICATIONS

The present application is a continuation of U.S. patent application Ser. No. 17/336,023, filed on Jun. 1, 2021 and U.S. patent application Ser. No. 16/879,267, filed on May 20, 2020, now U.S. Pat. No. 11,057,078 issued on Jul. 6, 2021, which claims priority from Japanese Patent Application No. 2019-097070, filed on May 23, 2019 and Japanese Patent Application No. 2020-037160, filed on Mar. 4, 2020, which are hereby incorporated by reference herein in their entireties.

BACKGROUND OF THE DISCLOSURE

Field of the Disclosure

The present disclosure relates to a wireless communication system.

Description of the Related Art

In recent years, there have been an increasing number of systems in which a device such as a camera is attached to medical equipment or industrial robots, and a large volume of data such as image signals is rapidly transmitted between a fixed portion and a movable portion that moves in parallel or rotates relative to the fixed portion. For example, in a CT apparatus, a large number of X-ray images are captured with different rotation angles using a gantry, which is a rotating portion, a computer provided in a fixed portion processes the captured X-ray images in accordance with a predetermined algorithm, and creates images for diagnosis or examination. For this purpose, a large number of X-ray images are transferred from the rotating portion to the fixed portion.

Japanese Patent Laid-Open No. 8-224233 discloses a communication system for performing data communication between a rotating portion and a fixed portion in such a CT apparatus. The communication system according to Japanese Patent Laid-Open No. 8-224233 has a differential transmission line, which is attached while being positioned substantially along a ring-shaped rotating frame as a whole, and a differential coupler, which is attached to a fixed frame. The differential coupler is positioned and disposed within a passage, sufficiently closely to the differential transmission line so as to be able to receive a signal that is applied to the differential transmission line through wireless coupling between the differential coupler and the differential transmission line.

The technology described in Japanese Patent Laid-Open No. 8-224233 provides a structure in which signal conductors of the differential coupler and the differential transmission line have the same size in their cross-sections taken along a rotational axis of the rotating portion, and in which the differential coupler and the differential transmission line symmetrically oppose each other. In this structure, however, if the rotating portion deviates in the rotational axis direction between the rotating portion and the fixed portion, a lateral deviation occurs in the positional relationship between the signal conductors of the differential coupler and the differential transmission line, and a differential signal received by the differential coupler significantly changes. As a result, there is concern that communication quality will be degraded, and an error will occur in data transmitted from the rotating portion to the fixed portion. The same problem may occur not only in systems in which a fixed portion and a rotating portion communicate with each other, but also in systems in which wireless communication is performed through electromagnetic coupling, such as a system in which a fixed portion and a movable portion that moves in parallel thereto communicate with each other.

SUMMARY OF THE DISCLOSURE

According to one aspect of the present disclosure, there is provided a wireless communication system that includes a first coupler having a first pair of electrodes; a second coupler having a second pair of electrodes that at least partially oppose the first pair of electrodes; a transmission circuit configured to apply a differential signal to the first coupler; and a reception circuit configured to receive a differential signal output from the second coupler based on electromagnetic coupling between the first coupler and the second coupler, wherein a distance between centroids of the first pair of electrodes differs from a distance between centroids of the second pair of electrodes.

According to another aspect of the present disclosure, there is provided a method for controlling a wireless communication system that has a first coupler having a first pair of electrodes, and a second coupler having a second pair of electrodes that at least partially oppose the first pair of electrodes, the method comprising: applying a differential signal to the first coupler; and receiving the differential signal output from the second coupler based on electromagnetic coupling between the first coupler and the second coupler, wherein a distance between centroids of the first pair of electrodes differs from a distance between centroids of the second pair of electrodes.

Further features and aspects of the present disclosure will become apparent from the following description of exemplary embodiments with reference to the attached drawings.

BRIEF DESCRIPTION OF THE DRAWINGS

FIG. 3A illustrates a change in a received differential signal in a conventional near-field communication system.

FIG. 3B illustrates principles of suppression of a change in the received differential signal according to the first example embodiment.

FIG. 5 shows simulation results according to a second example embodiment.

FIG. 9 illustrates principles of suppression of a change in a received differential signal according to a sixth example embodiment.

FIG. 10 illustrates principles of suppression of a change in a received differential signal according to a seventh example embodiment.

DESCRIPTION OF THE EMBODIMENTS

Figure 1:
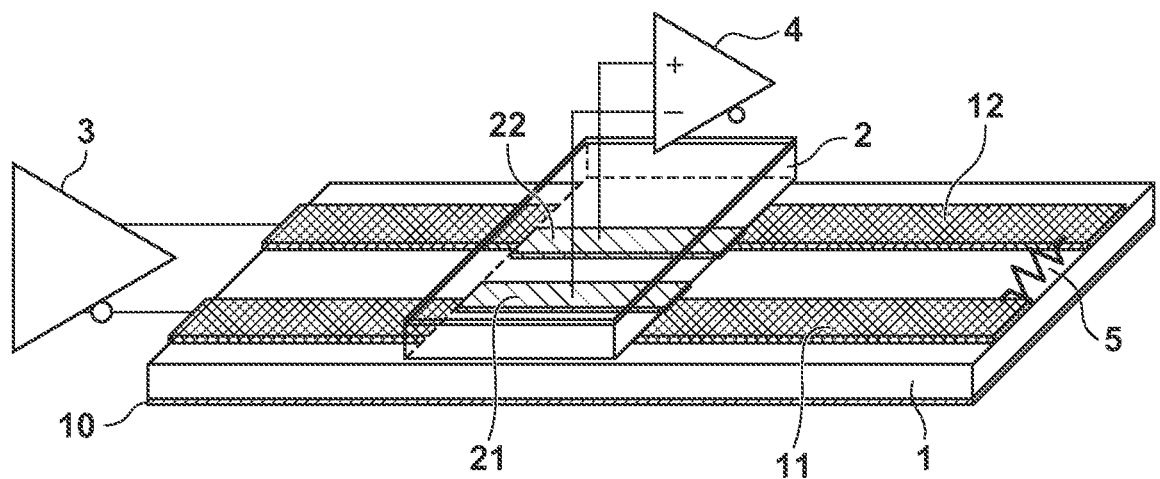
FIG. 1 is a perspective view of a near-field communication system according to a first example embodiment.

Hereinafter, numerous embodiments, features and aspects of the disclosure will be described in detail with reference to the attached drawings. Note, the following embodiments are not intended to limit the scope of the claimed disclosure. Multiple features are described in the embodiments, but limitation is not made an disclosure that requires all such features, and multiple such features may be combined as appropriate. Furthermore, in the attached drawings, the same reference numerals are given to the same or similar configurations, and redundant description thereof is omitted.

First Example Embodiment

FIG. 1 is a perspective view of a wireless communication system with a transmitter and a receiver according to the first embodiment. Note that the wireless communication system according to this embodiment is a system that performs communication through electromagnetic coupling between the transmitter and the receiver, and will be hereinafter referred to as a near-field communication system. The transmitter includes a differential transmission line 1, which serves as a transmission coupler, and a transmission circuit 3. The receiver includes a differential coupler 2, which serves as a reception coupler, and a reception circuit 4. The differential transmission line 1 and the differential coupler 2 are disposed such that they at least partially oppose each other. A differential signal output from the transmission circuit 3 is received by the reception circuit 4 through the transmission coupler and the reception coupler in an electromagnetically-coupled state. More specifically, upon a differential signal being applied from the transmission circuit 3 to the differential transmission line 1, the differential signal is output from the differential coupler 2 due to electromagnetic coupling between the differential transmission line 1 and the differential coupler 2, and the output differential signal is received by the reception circuit 4. The reception circuit 4 shapes the differential signal, which is a received wireless signal, to a desired digital signal waveform, and outputs the digital signal. That is to say, the reception circuit 4 connects to a pair of differential signal lines 21 and 22 on the differential coupler 2, and detects the differential signal received by the pair of differential signal lines. The digital signal output from the reception circuit 4 is used in various kinds of signal processing. That is to say, the pair of differential signal lines 21 and 22 are a pair of electrodes that function as antennas for wirelessly receiving differential signals.

The transmission circuit 3 has a function of outputting differential signals to the transmission coupler. If necessary, the transmission circuit 3 may have an amplifier, an attenuator, and/or any of various filter circuits. If the transmission circuit 3 has a distributor, or the like, for distributing a differential signal, power can be transmitted simultaneously to a plurality of transmission couplers. The reception circuit 4 has a function of converting a wireless signal into a digital signal, and specifically is realized by a comparator circuit or the like. Note that a filter circuit, such as a damping resistor, a low-pass filter, a high-pass filter, a band pass filter, a band stop filter, or a common-mode filter, may also be connected to the reception circuit 4 for the purpose of noise prevention. The reception circuit 4 may also have a multiplexer for combining a plurality of received signals. As mentioned above, the transmission coupler and the reception coupler are constituted by a combination of the differential transmission line 1 and the differential coupler 2.

Note that FIG. 1 shows a near-field communication system in which the transmission coupler and the reception coupler are constituted respectively by the differential transmission line 1 and the differential coupler 2, and the differential transmission line 1 is larger than the differential coupler 2. However, the relationship in terms of size between the differential transmission line 1 and the differential coupler 2 is not limited thereto, and the differential transmission line 1 may alternatively be smaller than the differential coupler 2. That is to say, a configuration may be employed in which a differential signal is applied to the differential signal lines 21 and 22, and differential signal lines 11 and 12 receive this differential signal.

The differential transmission line 1 is formed with a flat cable, a flexible substrate, a printed circuit board, or the like. For example, on the differential transmission line 1, a pair of differential signal lines 11 and 12, which have a microstrip structure or a coplanar structure, are formed on an insulating member, such as FR-4. A differential signal is applied from the transmission circuit 3 to the pair of differential signal lines 11 and 12. That is to say, the pair of differential signal lines 11 and 12 are a pair of electrodes that function as antennas for wirelessly transmitting differential signals. The differential signal lines 11 and 12 may be formed on an inner layer or a surface layer of a multilayer substrate. If the differential signal lines 11 and 12 are formed on the surface layer, it is preferable that the differential signal lines have been treated so as to be covered with a resist material or the like serving as a protection member, for example. A GND layer 10 is formed on a surface of the differential transmission line 1 on the side opposite to the surface on which the differential signal lines 11 and 12 are disposed.

On the differential transmission line 1, the widths of the differential signal lines 11 and 12 (differential signal line widths) and the distance between the differential signal lines 11 and 12 (distance between the signal lines) are determined so as to achieve desired characteristic impedance. One ends of the differential signal lines 11 and 12 are terminated with a termination circuit 5, and the transmission circuit 3 is connected to the other ends. For example, the differential signal line widths and the distance between the signal lines are determined such that the differential impedance is 100Ω. However, the differential signal line widths and the distance between the signal lines need only be appropriate for the transmission circuit 3 and the termination circuit 5, and are not specifically limited. If the differential transmission line 1 is to have a long length, such a differential transmission line 1 can be realized by connecting a plurality of substrates with the configuration shown in FIG. 1. In this case, regarding the substrates to be connected, the differential signal lines need only have a substantially equal differential characteristic impedance and are electrically connected to each other, and there is no limitation on electrical material constants and the layer configuration of the substrate.

The differential coupler 2 may also be formed with a printed circuit board or the like, similarly to the differential transmission line 1. The differential coupler 2 is disposed with two ends of each of the differential signal lines 21 and 22 being electrically disconnected. The differential signal lines 21 and 22 receive, through electromagnetic coupling, the differential signal applied to the differential signal lines 11 and 12 on the differential transmission line 1, and supply the received differential signal to the reception circuit 4. A GND layer 20 (see FIG. 2A) is formed on a surface of the differential coupler 2 on the side opposite to the surface on which the differential signal lines 21 and 22 are disposed. Although FIG. 1 shows a configuration in which the reception circuit 4 is electrically connected substantially at the center position of each of the differential signal lines 21 and 22 in the longitudinal direction thereof, but this need not be the case. For example, a so-called directional coupler may alternatively be employed in which one ends of the differential signal lines 21 and 22 are terminated with a termination circuit, and the reception circuit 4 is connected to the other end. The length of the differential coupler 2 is shorter than the length of the differential transmission line 1, and is adjusted based on the transmission speed of a differential signal. The differential transmission line 1 and the differential coupler 2 are disposed such that the positional relationship therebetween is maintained in which they at least partially oppose each other, while they can relatively move with respect to each other in a predetermined direction (e.g. a direction substantially perpendicular to the direction in which the differential signal lines 21 and 22 are arranged, namely the left-right direction in FIG. 1). For example, the differential transmission line 1 is disposed on a moving/rotating side, and the differential coupler 2 is disposed on a fixed side. Otherwise, the differential transmission line 1 is disposed on the fixed side, and the differential coupler 2 is disposed on the moving/rotating side. In a preferable example, a configuration is employed in which the differential transmission line 1 and the differential coupler 2 are disposed respectively on a rotating portion (gantry) side and a fixed portion side of a CT apparatus, and X-ray information is transmitted from the rotating portion to the fixed portion. However, a configuration may alternatively be employed in which both the differential transmission line 1 and the differential coupler 2 move. The near-field communication system has a driving portion (movement control portion), such as a motor, for moving at least one of the differential transmission line 1 and the differential coupler 2 in the predetermined direction.

Electromagnetic coupling according to this embodiment includes both electric field coupling and magnetic field coupling. That is to say, wireless communication between the couplers may be performed through electric field coupling, or may be performed through magnetic field coupling, or may be performed through both electric field coupling and magnetic field coupling. Magnetic field coupling includes electromagnetic induction and magnetic resonance. Note that this embodiment mainly describes the case where wireless communication is performed through electric field coupling.

In this embodiment, the direction in which the centroid of the differential signal line 21 and the centroid of the differential signal line 22 are connected substantially coincides with the direction in which the centroid of the differential signal line 11 and the centroid of the differential signal line 12 are connected. Note that the differential signal line 11 and the differential signal line 12 have substantially the same size and shape, and the differential signal line 21 and the differential signal line 22 have substantially the same size and shape. However, the relationship in terms of size and shape between the differential signal lines is not limited thereto.

Figure 2A:
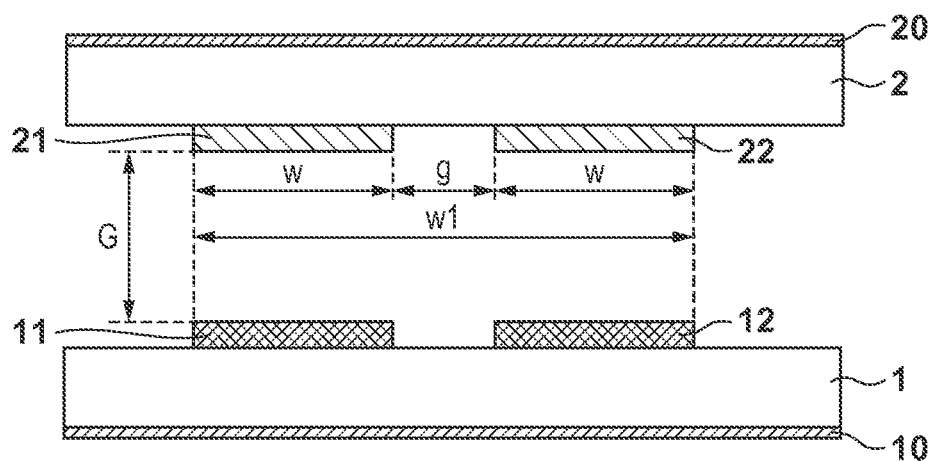
FIGS. 2A and 2B are cross-sectional views of a differential transmission line and a differential coupler according to the first example embodiment.

Next, a description will be given, with reference to FIGS. 2A and 2B, a difference in configuration between the near-field communication system according to the first embodiment and a conventional near-field communication system. FIG. 2A is a cross-sectional view of a conventional differential transmission line 1 and differential coupler 2, such as those disclosed in Japanese Patent Laid-Open No. 8-224233. As shown in FIG. 2A, the sums of the differential signal line widths (w) and the distance between the signal lines (g) on the differential transmission line 1 and the differential coupler 2 are the same, and are both w1. Note that all of the differential signal lines 11 and 12 and the differential signal lines 21 and 22 have an equal signal line width. Also, the distance (gap) between the differential signal lines 11 and 12 and the differential signal lines 21 and 22 is denoted as G.

Figure 2B:
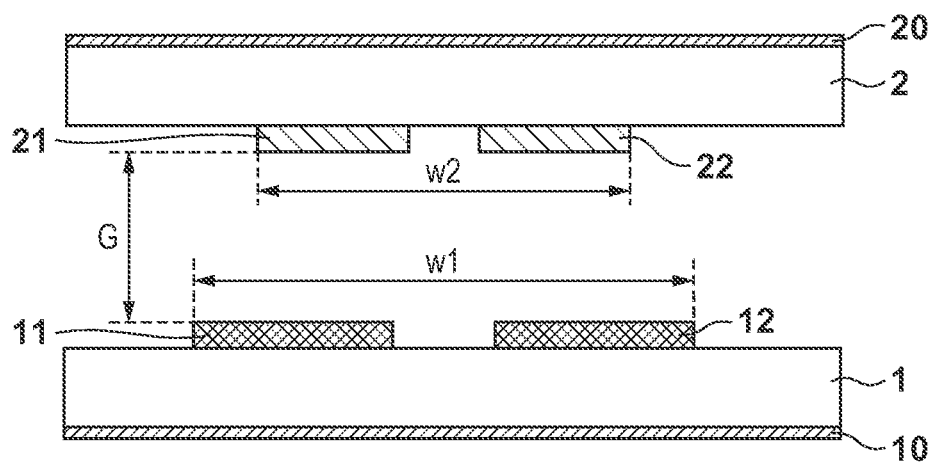

FIG. 2B is a cross-sectional view of the differential transmission line 1 and the differential coupler 2 according to the first embodiment. A sum w2 of the differential signal line widths and the distance between the signal lines on the differential coupler 2 is smaller than a sum w1 of the differential signal line widths and the distance between the signal lines on the differential transmission line 1. Note that the differential signal lines 11 and 12 have an equal line width, and the differential signal lines 21 and 22 also have an equal line width. In this example, the line width of each of the differential signal lines 21 and 22 is narrower than the line width of each of the differential signal lines 11 and 12. The differential coupler 2 is disposed relative to the differential transmission line 1 such that the center axes between corresponding differential signal lines coincide with each other as much as possible, with the gap G provided between the differential signal lines. On the differential transmission line 1, the differential signal line 11, to which a non-inverted signal is transmitted, and the differential signal line 12, to which an inverted signal is transmitted, are formed. The non-inverted signal and the inverted signal are induced respectively on the differential signal lines 21 and 22 formed on the differential coupler 2, by the differential signal lines 11 and 12 on the differential transmission line 1.

A description will be given, with reference to FIGS. 3A and 3B, of principles of the fact that the near-field communication system according to the first embodiment is resistant to a lateral deviation. FIGS. 3A and 3B illustrate voltages received when a lateral deviation is caused between the differential transmission line 1 and the differential coupler 2 shown in FIGS. 2A and 2B. Note that the lateral deviation refers to a deviation in a direction that is perpendicular to the direction in which a differential signal is transmitted (i.e. a direction from the differential transmission line 1 toward the differential coupler 2) and is also perpendicular to the direction in which the differential coupler 2 moves (i.e. the longitudinal direction of the differential signal lines 11 and 12).

First, a description will be given of the case of the conventional near-field communication system in which the sums of the differential signal line widths and the distance between the signal lines on the differential transmission line 1 and the differential coupler 2 are equal, as shown in FIG. 2A. As shown on the left side of FIG. 3A, the maximum coupling state is entered when the middle of the sum of the differential signal line widths and the distance between the signal lines on the differential transmission line 1 coincides with that on the differential coupler 2 (i.e. no lateral deviation has occurred). In this case, the magnitude of an inverted signal and a non-inverted signal that can be received by the differential coupler 2 are the same and largest. It is assumed below that the differential voltage that is the difference in the amplitude between the inverted signal and the non-inverted signal in this state is 1.

The right side of FIG. 3A shows a state where a lateral deviation Y, which is a deviation in a direction perpendicular to the direction in which the differential signal is transmitted, has occurred in the state shown on the left side of FIG. 3A. In this case, both the two differential signal lines move away from the respective opposite differential signal lines. As a result, both the amplitudes of the inverted signal and the non-inverted signal that can be received by the differential coupler 2 decrease (by 30% in the example shown in FIG. 3A), and the differential voltage that is the difference in the amplitude therebetween also decreases. Note that, more strictly, the differential signal line 21 on which the non-inverted signal is induced approaches the differential signal line 12 from which the inverted signal is transmitted, as shown on the right side of FIG. 3A. Thus, the voltage generated on the differential signal line 21 is partially canceled, and the non-inverted signal induced on the differential signal line 21 further decreases.

Next, the case of the near-field communication system according to this embodiment will be described. Here, a description will be given of the case where the sum w2 of the differential signal line widths and the distance between the signal lines on the differential coupler 2 is smaller than the sum w1 of the differential signal line widths and the distance between the signal lines on the differential transmission line 1, as shown in FIG. 2B. As shown on the left side of FIG. 3B, the signals lines for inverted signal and the signal lines for the non-inverted signal are not in the maximum coupling state, respectively, when the differential transmission line 1 and the differential coupler 2 are disposed opposing each other with their center axes coinciding with each other (i.e. with the center of w1 coinciding with that of w2). For this reason, the level of the differential voltage that can be received by the differential coupler 2 is smaller than that in the state shown on the left side of FIG. 3A. However, the degrees of coupling between the differential signal lines are the same, and thus, the received voltages of the inverted signal and the non-inverted signal are the same, achieving a balanced state. In FIG. 3B, the amplitude of both the non-inverted signal and the inverted signal is 0.35, and the differential voltage is 0.7.

The right side of FIG. 3B shows the case where a lateral deviation Y, which is a deviation in a direction perpendicular to the direction in which the signal is transmitted, has occurred in the state shown on the left side of FIG. 3B. Since the differential signal line 11 on the differential transmission line 1 and the differential signal line 21 on the differential coupler 2 move in directions away from each other, and thus, the non-inverted signal induced on the differential signal line 21 further decreases. In the example in FIG. 3B, the amplitude value decreases from 0.35 to 0.25. However, the differential signal line 12 on the differential transmission line 1 and the differential signal line 22 on the differential coupler 2 move in directions approaching each other (i.e. approaching to the maximum coupling state), and thus, the inverted signal induced on the differential signal line 22 increases. In the example shown in FIG. 3B, the amplitude value increases from 0.35 to 0.4. Accordingly, the change (0.7→0.65) in the differential voltage that can be received by the differential coupler 2 is smaller than the change (1.0→0.7) in the case where a lateral deviation has occurred in FIG. 3A.

According to the above-described principles, the change in the differential voltage with respect to a lateral deviation can be reduced by making the sum w2 of the differential signal line widths and the distance between the signal lines on the differential coupler 2 smaller than the sum w1 of the differential signal line widths and the distance between the signal lines on the differential transmission line 1.

Actual measurement results for verifying the effects of the first embodiment will be described below. Fluorocarbon resin substrates NPC-H220A, manufactured by Nippon Pillar Packing Co., Ltd. with a nominal thickness of 1.6 mm were used as base materials of the differential transmission line 1 and the differential coupler 2. In the differential transmission line 1 and the differential coupler 2, the copper film thickness was 35 μm, and the GND width was 30 mm. In the differential transmission line 1, the differential signal line width was 5 mm, and the distance between the signal lines was 4.8 mm. Accordingly, the sum of the differential signal line widths and the distance between the signal lines on the differential transmission line 1 and the sum of the differential signal line widths and the distance between the signal lines on the differential coupler 2 were both 14.8 mm. A differential signal in a CIVIL format was supplied via an RF amplifier to one ends of the differential signal lines 11 and 12 on the differential transmission line 1 by an FPGA. Note that the transmission signal pattern was PRBS7, and the transmission data rate was 2 Gbps. The other ends of the differential signal lines 11 and 12 were connected to the GND via a chip resistor of 51Ω.

Two types of near-field communication systems that use the above-described differential transmission line 1 and two types of differential couplers 2, which will be described below, were prepared as evaluation samples. In the following description, these evaluation samples will be referred to as an evaluation sample 1 and an evaluation sample 2.

Figure 4A:
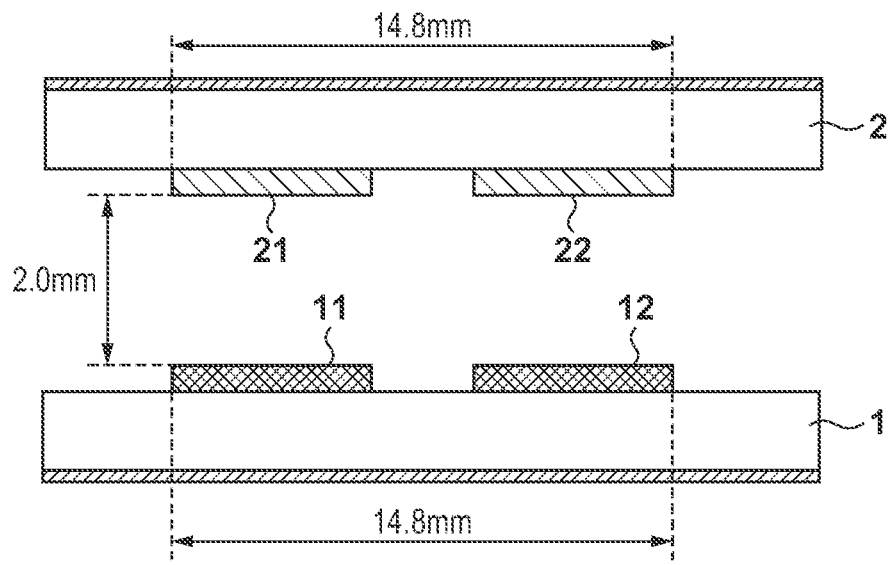
FIGS. 4A and 4B are cross-sectional views of evaluation samples according to the first example embodiment.

FIG. 4A is a cross-sectional view of the differential transmission line 1 and the differential coupler 2 of the evaluation sample 1. The differential signal line width of each of the differential signal lines 21 and 22 on the differential coupler 2 and the distance therebetween of the evaluation sample 1 were 5 mm and 4.8 mm, respectively, and were the same as those of the differential signal lines 11 and 12 on the differential transmission line 1. The length of the differential coupler 2 was 30 mm. A signal was pulled out from the center of the differential coupler 2, through vias, to the surface thereof on the side opposite to the differential signal lines 21 and 22, and was connected to a coaxial connector (in the samples, U.FL connector manufactured by Hirose Electric, Co., Ltd. is used). The connector was then converted to an SMA connector. The waveform of the signal was then measured using an oscilloscope. The measurement results are shown in Table 1. According to Table 1, when a lateral deviation was caused by 1.2 mm from a state where no lateral deviation has occurred, the amplitude attenuated substantially to less than 80%.

Figure 4B:
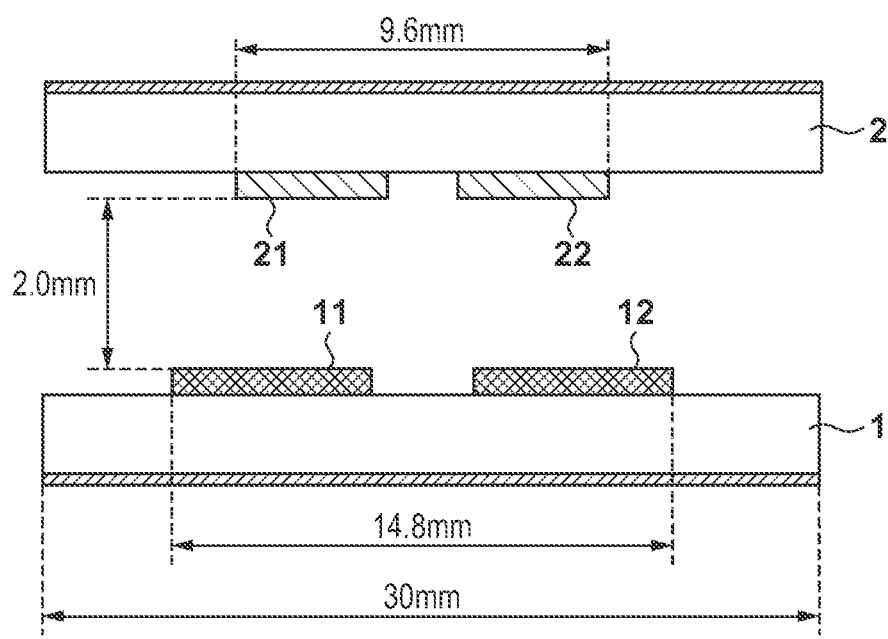

FIG. 4B is a cross-sectional view of the differential transmission line 1 and the differential coupler 2 of the evaluation sample 2. The differential signal line width of each of the differential signal lines 21 and 22 on the differential coupler 2 and the distance therebetween of the evaluation sample 2 were 4 mm and 1.6 mm, respectively, and were narrower than those of the differential signal lines 11 and 12 on the differential transmission line 1. That is to say, the sum w2 (=9.6 mm) of the differential signal line widths and the distance between the signal lines on the differential coupler 2 were smaller than the sum w1 (=14.8 mm) of the differential signal line widths and the distance between the signal lines on the differential transmission line 1. Similarly to the evaluation sample 1, the results of measuring a change in the differential voltage received by the evaluation sample 2 using an oscilloscope are shown in Table 2. It is understood from Table 2 that, even if a lateral deviation is caused by 1.2 mm in a state where no lateral deviation has occurred, the decrease in the amplitude of the received signal is suppressed to appropriately 2%.

TABLE 1

Evaluation Sample 1

|  | Y = 0 mm | Y = 1.2 mm | Influence on Decrease in Amplitude Due to Lateral Deviation |
|---|---|---|---|
| Smallest Amplitude [mV] | 382 | 298 | 0.78 |
| Largest Amplitude [mV] | 432 | 382 | 0.77 |
| Average Amplitude [mV] | 407 | 315 | 0.77 |

TABLE 2

Evaluation Sample 2

|  | Y = 0 mm | Y = 1.2 mm | Influence on Decrease in Amplitude Due to Lateral Deviation |
|---|---|---|---|
| Smallest Amplitude [mV] | 242 | 240 | 0.99 |
| Largest Amplitude [mV] | 314 | 306 | 0.97 |
| Average Amplitude [mV] | 278 | 273 | 0.98 |

It is understood from the above measurement results that the change in the received signal with respect to a lateral deviation can be better suppressed when the sum of the differential signal line widths and the distance between the signal lines on the differential coupler 2 is smaller than that on the differential transmission line 1, than when the aforementioned sums on the differential transmission line 1 and the differential coupler 2 are equal.

As described above, with the near-field communication system according to the first embodiment, the change in the differential signal voltage can be suppressed when a lateral deviation occurs, and a system with increased communication quality in near-field wireless communication can be provided. An effect can also be achieved that the near-field communication system can be made unlikely to be affected by extraneous noise by narrowing the distance between the signal lines on the differential coupler 2. In addition, if a configuration is employed in which the differential signal lines 21 and 22 are electrically connected to the reception circuit 4 substantially at the center of their line length as shown in FIG. 1, the length of the differential coupler is halved, and thus rapid transmission can be realized. Moreover, signals can be received regardless of the direction in which power is supplied through the differential transmission line.

Second Example Embodiment

In the first embodiment, a change in the received voltage level was actually measured with two evaluation samples by an oscilloscope to verify the effects of the embodiment. In the second embodiment, a change in a received voltage is calculated through 3D electromagnetic field simulation using the differential signal line width and the distance between the signal lines on the differential coupler as parameters. Table 3 shows a list of parameters of the evaluation samples. In Table 3, as for the evaluation sample 1, the sums of the differential signal line widths and the distance between the signal lines on the differential transmission line 1 and on the differential coupler 2 are the same. As for the evaluation samples 2 to 4, the differential signal line width and the distance between the signal lines on the differential coupler 2 are smaller than those on the differential transmission line 1. That is to say, as for the evaluation samples 2 to 4, the sum of the differential signal line widths and the distance between the signal lines on the differential coupler 2 is smaller than the sum of the differential signal line widths and the distance between the signal lines on the differential transmission line 1. In the following description, w1 and w2 will also be referred to as the width of the differential signal line pair.

TABLE 3

List of Evaluation Samples

|  | Differential Signal Line Width[mm] | Distance between Signal Lines [mm] | Width of Differential Signal Line Pair [mm] |
|---|---|---|---|
| Evaluation Sample 1 | 5 | 4.8 | 14.8 |
| Evaluation Sample 2 | 4 | 1.6 | 9.6 |
| Evaluation Sample 3 | 3 | 1.4 | 7.4 |
| Evaluation Sample 4 | 2 | 0.38 | 4.38 |

FIG. 5 shows the results of simulating changes in the received voltage due to the occurrence of a lateral deviation with the evaluation samples 1 to 4 shown in Table 3. The horizontal axis indicates the lateral deviation amount, which is normalized by a value obtained by dividing the lateral deviation by half the sum of the differential signal line widths and the distance between the signal lines on the differential transmission line 1, namely by 7.4 mm. The vertical axis indicates the received voltage, which is normalized by a value obtained by dividing the received voltage by a received voltage obtained when the differential signal lines 11 and 12 directly oppose the differential signal lines 21 and 22, respectively. The gap between the differential transmission line and the differential coupler is 1 mm. It can be understood that the evaluation samples 2 and 3 are more resistant to a lateral deviation than the evaluation sample 1 if the lateral deviation occurring in the near-field communication system is about 20% (about 3 mm in this embodiment) or less of the width of the differential signal line pair on the differential transmission line 1. It can also be understood from the parameters of the evaluation sample 3 that the present configuration is effective to a lateral deviation if the width of the differential signal line pair on the differential coupler 2 is about half or less of the width of the differential signal line pair on the differential transmission line 1. That is to say, it is preferable that the width of the differential signal line pair on the differential transmission line 1 is half or more of the width of the differential signal line pair on the differential coupler 2.

Third Example Embodiment

Figure 6A:
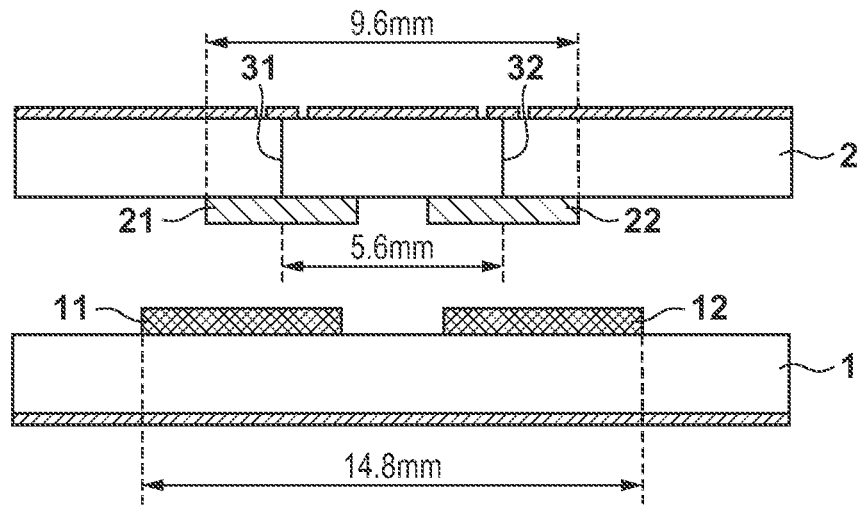
FIGS. 6A to 6C are cross-sectional views of a near-field communication system according to a third example embodiment.
Figure 6B:
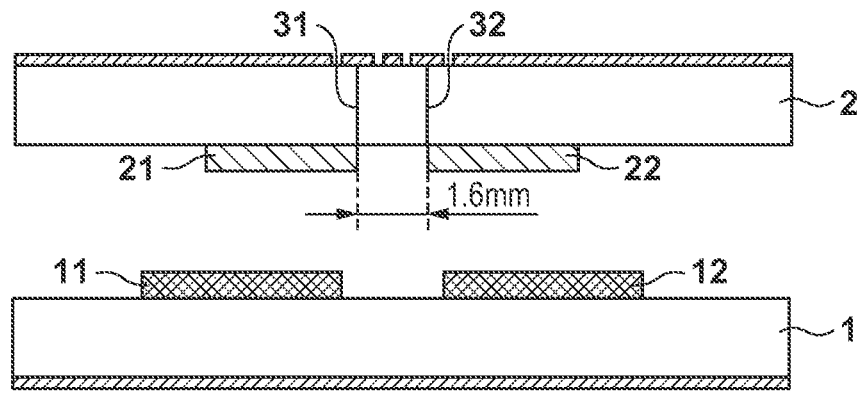
Figure 6C:
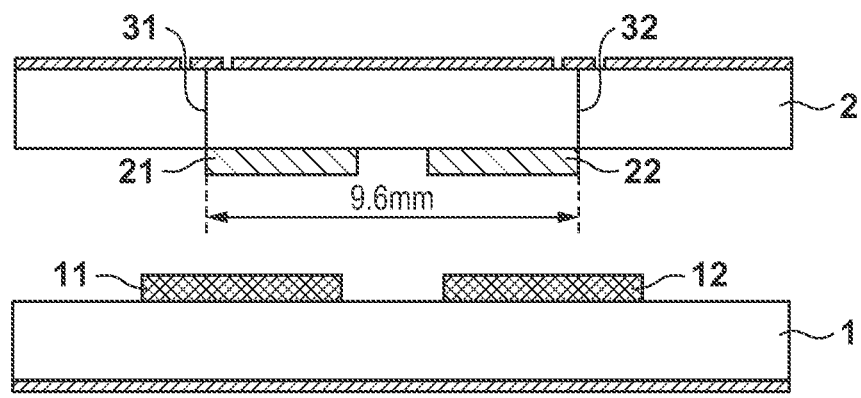

FIGS. 6A to 6C show cross-sectional views of the differential transmission line 1 and the differential coupler 2 of a near-field communication system according to the third embodiment. In the third embodiment, the positions will be examined at which vias 31 and 32 for picking up signals from the differential signal lines 21 and 22 on the differential coupler 2 are connected. The dimensions of the differential signal lines on the differential transmission line 1 and the differential coupler 2 are the same as those of the evaluation sample 2 in the second embodiment. In the third embodiment, parameters are the positions, on the differential signal line 21 and 22, of the vias 31 and 32 for pulling out signals on the differential signal lines 21 and 22 on the differential coupler 2 to the back surface thereof. FIG. 6A shows an example in which the vias are disposed at the center of the respective differential signal lines 21 and 22, and the distance between the vias is 5.6 mm. FIG. 6B shows an example in which the vias are disposed inward of the differential signal lines 21 and 22, and the distance between the vias is 1.6 mm. FIG. 6C shows an example in which the vias are disposed outward of the differential signal lines 21 and 22, and the distance between the vias is 9.6 mm. The lateral deviation is 1.5 mm. Other settings are the same as those of the second embodiment.

Table 4 shows the results of simulating a change in the received voltage. Table 4 shows the simulation results, taking the evaluation samples in FIGS. 6A, 6B, and 6C as the evaluation samples 1, 2, and 3, respectively. It can be understood from Table 4 that it is preferable to dispose a via at a position on the other signal line side relative to the center of the line width of each of differential signal lines, and it is more preferable to dispose the vias at inner ends of the two differential signal lines (FIG. 6B).

coupling in the differential signal pair can be enhanced, and radiation noise can be suppressed.

As described above, with the near-field communication system according to the fourth embodiment, the distance between the signal lines on the differential transmission line is shorter, and thus, the system is more resistant to a lateral deviation and can suppress radiation noise from the differential transmission line. Note that the content described in the first to third embodiments can be applied to the configuration described in the fourth embodiment (in which the width of the differential signal line pair on the differential transmission line is smaller than the width of the differential signal line pair on the differential coupler). That is to say, a configuration may be employed in which the differential transmission line is replaced with the differential coupler and vice versa in the relationship in terms of size between the differential signal line pair on the differential transmission line and the differential signal line pair on the differential coupler described in the first to third embodiments.

Fifth Example Embodiment

Figure 8:
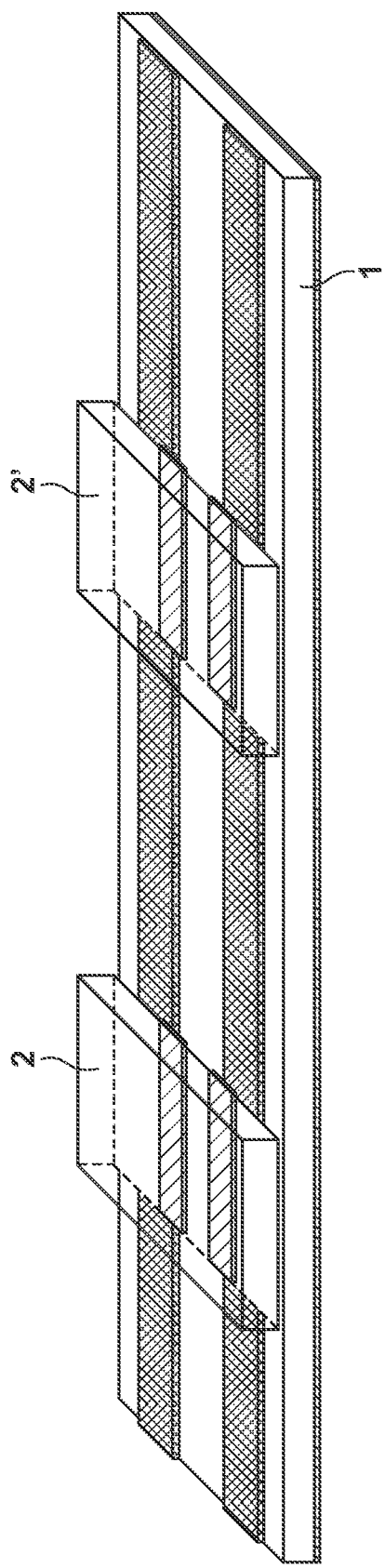
FIG. 8 is a perspective view of a near-field communication system according to a fifth example embodiment.

FIG. 8 is a perspective view of a near-field communication system according to the fifth embodiment. As shown in FIG. 8, a plurality of differential couplers 2 and 2' can also be provided for the differential transmission line 1. This configuration is suitable for realizing bus wiring of a non-contact type. The bandwidth can be broadened by providing

TABLE 4

| | Change in Received Voltage Due to Via Position | | | | | |
|---|---|---|---|---|---|---|
| Lateral | Evaluation Sample 1 | | Evaluation Sample 2 | | Evaluation Sample 3 | |
| Deviation | Not Occurred | Occurred | Not Occurred | Occurred | Not Occurred | Occurred |
| Largest Amplitude | 0.14033 | 0.12637 | 0.13799 | 0.12765 | 0.13939 | 0.12757 |
| Smallest Amplitude | 0.11835 | 0.10725 | 0.12656 | 0.1167 | 0.10884 | 0.096804 |
| Change in Largest Amplitude [%] | 9.9 | | 7.5 | | 8.5 | |
| Change in Smallest Amplitude [%] | 9.4 | | 7.8 | | 11.1 | |

Fourth Example Embodiment

Figure 7A:
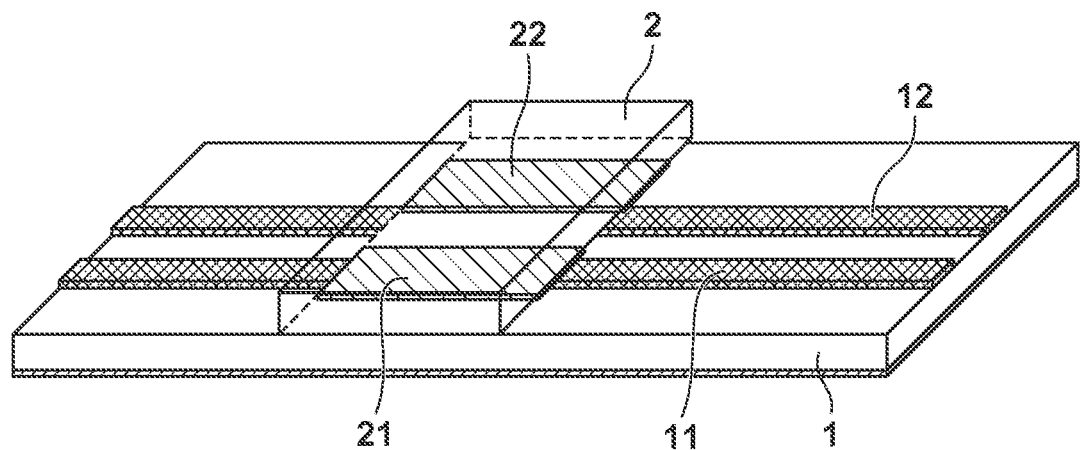
FIG. 7A is a perspective view of a near-field communication system according to a fourth example embodiment.
Figure 7B:
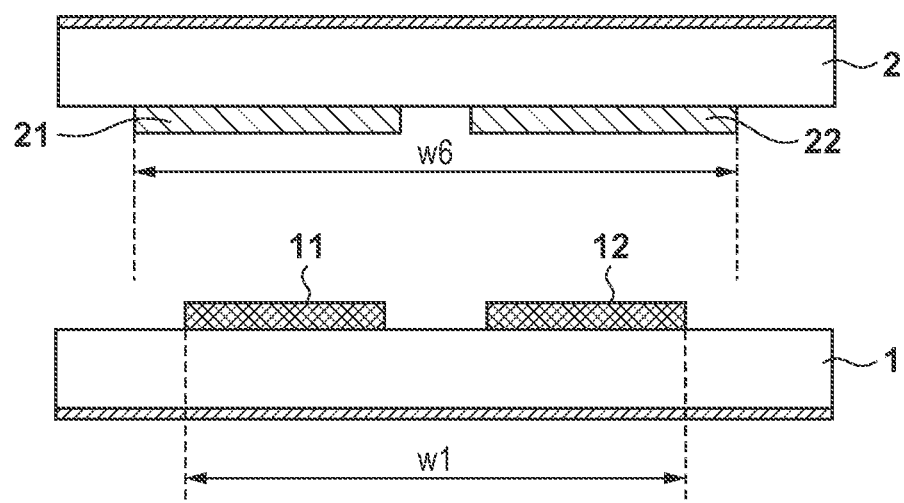
FIG. 7B is a perspective view of a near-field communication system according to the fourth example embodiment.

FIG. 7A is a perspective view of a near-field communication system according to the fourth embodiment, and FIG. 7B is a cross-sectional view of the differential transmission line 1 and the differential coupler 2 according to the fourth embodiment. In the fourth embodiment, a width w6 of the differential signal line pair on the differential coupler 2 is larger than the width w1 of the differential signal line pair on the differential transmission line 1. In principle, the configuration of this embodiment has the same effects as those of the configuration in which the width of the differential signal line pair on the differential coupler 2 is narrower than the width of the differential signal line pair on the differential transmission line 1 (e.g. the configuration of the first embodiment). Furthermore, in the configuration of the fourth embodiment, the distance between the signal lines on the differential transmission line 1 is shorter. Thus, the frequency characteristics to each of the plurality of differential couplers 2 and performing addition at the reception circuit.

As described above, with the near-field communication system according to the fifth embodiment, signals on the differential transmission line 1 can be received by the plurality of differential couplers 2. Furthermore, the communication bandwidth can be broadened by shifting the frequency characteristics of the differential couplers and combining signals.

Sixth Example Embodiment

FIG. 9 is a cross-sectional view of the differential transmission line 1 and the differential coupler 2 according to the sixth embodiment. The sum w1 of the differential signal line widths and the distance between the signal lines is substantially equal between the differential transmission line 1 and the differential coupler 2. The width of each the differential signal line 11 and 12 on the differential transmission line 1 is larger than the width of each of the differential signal lines 21 and 22 on the differential coupler 2. A distance w4 between the differential signal lines on the differential transmission line 1 is smaller than a distance w3 between the differential signal lines on the differential coupler 2.

The right side of FIG. 9 shows a state where a lateral deviation Y, which is a deviation in a direction perpendicular to the direction in which the differential signal is transmitted, has occurred in the state shown on the left side of FIG. 9. As a result of the differential coupler 2 having laterally deviated by a distance Y, the degree of coupling between the differential signal lines 11 and 12 on the differential transmission line 1 and the differential signal lines 21 and 22 on the differential coupler 2 changes. 9a and 9b denote the degree of coupling between the differential signal lines on the differential transmission line 1 and the differential coupler 2 in terms of voltage. The higher the voltage, the higher the degree of coupling. In a state where no lateral deviation has occurred as shown on the left side of FIG. 9, a degree of coupling 91 between the differential signal line 11 and the differential signal line 21 and a degree of coupling 92 between the differential signal line 12 and the differential signal line 22 are equal and are 0.4 V, and the differential voltage is 0.8 V. Here, the minus of the differential voltage is not indicated.

In the state shown on the right side of FIG. 9, the differential signal lines 11 and 21 directly oppose each other due to a lateral deviation of the differential coupler 2 having occurred by Y, and a degree of coupling 93 therebetween increases. Conversely, the distance between the differential signal lines 12 and 22 increases due to the lateral deviation of the differential coupler 2 having occurred by Y, and thus, a degree of coupling 94 therebetween decreases. 9b indicates that the degree of coupling 93 between the differential signal lines 11 and 21 is 0.5 V, and the degree of coupling 94 between the differential signal lines 12 and 22 is 0.25 V. As a result, the differential voltage is 0.75 V, and the degree of coupling does not significantly decrease compared with the case where no lateral deviation has occurred (0.8 V in this example). Accordingly, the disposition of the differential signal lines shown in FIG. 9 can maintain communication even when a lateral deviation of the differential coupler 2 occurs.

Seventh Example Embodiment

FIG. 10 is a cross-sectional view of the differential transmission line 1 and the differential coupler 2 according to the seventh embodiment. In this disposal, a sum w11 of the differential signal line widths and the distance between the signal lines on the differential coupler 2 is larger than the sum w1 of the differential signal line widths and the distance between the signal lines on the differential transmission line 1. However, similarly to FIG. 9, the width of each of the differential signal lines 11 and 12 on the differential transmission line 1 is larger than the width of each of the differential signal lines 21 and 22 on the differential coupler 2, and a distance w4 between the differential signal lines on the differential transmission line 1 is smaller than a distance w3 between the differential signal lines on the differential coupler 2.

The right side of FIG. 10 shows a state where a lateral deviation Y, which is a deviation in a direction perpendicular to the direction in which the differential signal is transmitted, has occurred in the state shown on the left side of FIG. 10. Due to the differential coupler 2 having laterally deviated by a distance Y, the degree of coupling between the differential signal lines 11 and 12 on the differential transmission line 1 and the differential signal lines 21 and 22 on the differential coupler 2 changes.

10a and 10b denote the degree of coupling between the differential signal lines on the differential couplers in terms of voltage. The higher the voltage, the higher the degree of coupling. 10a indicates that a degree of coupling 101 between the differential signal lines 11 and 21 and a degree of coupling 102 between the differential signal lines 12 and 22 are equal and are 0.35 V, and the differential voltage is 0.7 V. Here, the minus of the differential voltage is not indicated.

In the configuration in FIG. 10, the differential signal lines 21 and 22 are disposed outward of the differential signal lines 11 and 12 on the differential transmission line 1, and thus, the degree of coupling is weaker than the degree of coupling in FIG. 9. 10a denotes the degree of coupling before the differential coupler 2 is deviated, and 10b denotes the degree of coupling when a lateral deviation of the degree of coupling 2 has occurred by Y. As for the degree of coupling 103, the differential signal lines 11 and 21 directly oppose each other due to a lateral deviation of the differential coupler 2 having occurred by Y, and thus, the degree of coupling increases. Conversely, as for the degree of coupling 104, the distance between the differential signal lines 12 and 22 increases due to the lateral deviation of the differential coupler 2 having occurred by Y, and thus, the degree of coupling decreases. In this example, the degree of coupling 103 between the differential signal lines 11 and 21 is 0.5 V, and the degree of coupling 104 between the differential signal lines 12 and 22 is 0.2 V. As a result, the differential voltage is 0.7 V, and the degree of coupling is equal to the degree of coupling, namely 0.7 V, in the case where no lateral deviation has occurred. Accordingly, it is understood that the disposal of the differential signal lines shown in FIG. 10 can maintain communication even when a lateral deviation of the differential coupler 2 occurs.

FIG. 3B illustrates the case where the distance between the differential signal lines 21 and 22 is smaller than the distance between the differential signal lines 11 and 12. In contrast, w4<w3 in the disposal of the differential signal lines on the differential couplers in FIGS. 9 and 10. In this case, since the distance between the differential signal lines 21 and 22 in FIGS. 9 and 10 is larger, the capacitive coupling between the lines decreases, and the high-frequency characteristics improve. The disposal of the differential signal lines can be considered while giving consideration to the space for mounting the differential couplers.

As described above, in the communication system according to the embodiments, the distance between the centroid of the differential signal line 21 and the centroid of the differential signal line 22 differs from the distance between the centroid of the differential signal line 11 and the differential signal line 22. With this configuration, the change in the differential voltage remains small even if a lateral deviation occurs between the differential transmission line 1 and the differential coupler 2, and deterioration in communication quality due to a position shift between devices that wirelessly communicate with each other through electromagnetic coupling is suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A wireless communication system comprising:
a first coupler having a first pair of electrodes;
a second coupler having a second pair of electrodes that at least partially oppose the first pair of electrodes;
a transmission circuit configured to transmit a differential signal to the first coupler; and
a reception circuit configured to receive a differential signal output from the second coupler based on electromagnetic coupling between the first coupler and the second coupler,
wherein
the first pair of electrodes have a first electrode and a second electrode,
the second pair of electrodes have a third electrode corresponding to the first electrode and a fourth electrode corresponding to the second electrode, and
the first coupler and the second coupler are formed so that a degree of coupling between the first electrode and the third electrode increases in a case where the first coupler or the second coupler moves in a predetermined direction in which a degree of coupling between the second electrode and the fourth electrode decreases.

2. The system according to claim 1, wherein a first direction in which the first and second electrodes of the first pair of electrodes are aligned substantially coincides with a second direction in which the third and fourth electrodes of the second pair of electrodes are aligned.

3. The system according to claim 2, wherein a width of each of the first pair of electrodes in the first direction differs from a width of each of the second pair of electrodes in the second direction.

4. The system according to claim 2, wherein the predetermined direction is substantially identical to the first direction.

5. The system according to claim 1, wherein a length of each of the first pair of electrodes in a perpendicular direction to the predetermined direction differs from a length of each of the second pair of electrodes in a perpendicular direction to the predetermined direction.

6. The system according to claim 1, wherein a first sum of widths of the first pair of electrodes and a distance there between differs from a second sum of widths of the second pair of electrodes and a distance there between.

7. The system according to claim 6, wherein a smaller one of the first sum and the second sum is half or more the other one of the first sum and the second sum.

8. The system according to claim 1, wherein the reception circuit is connected to each of the second pair of electrodes at a position closer to other electrode than a center of width of one electrode.

9. The system according to claim 1, wherein the reception circuit is connected to the second pair of electrodes through respective vias.

10. The system according to claim 1, further comprising a third coupler having a pair of third electrodes that at least partially oppose the second pair of electrodes.

11. The system according to claim 1,
wherein a first sum of widths of the first pair of electrodes and a distance there between is substantially equal to a second sum of widths of the second pair of electrodes and a distance there between,
the width of each of the first pair of electrodes is narrower than the width of each of the second pair of electrodes, and
the distance between the first pair of electrodes is longer than the distance between the second pair of electrodes.

12. The system according to claim 1,
wherein a second sum of widths of the second pair of electrodes and a distance there between is larger than a first sum of widths of the first pair of electrodes and a distance there between,
the width of each of the first pair of electrodes is narrower than the width of each of the second pair of electrodes, and
the distance between the first pair of electrodes is longer than the distance between the second pair of electrodes.

13. The system according to claim 1, wherein the first pair of electrodes have substantially the same size and shape, and the second pair of electrodes have substantially the same size and shape.

14. The system according to claim 1, wherein a distance between the first pair of electrodes differs from a distance between the second pair of electrodes.

15. A method for controlling a wireless communication system that has a first coupler having a first pair of electrodes, and a second coupler having a second pair of electrodes that at least partially oppose the first pair of electrodes, the method comprising:
transmitting a differential signal to the first coupler; and
receiving the differential signal output from the second coupler based on electromagnetic coupling between the first coupler and the second coupler,
wherein
the first pair of electrodes have a first electrode and a second electrode,
the second pair of electrodes have a third electrode and a fourth electrode, and
the first coupler and the second coupler are formed so that a degree of coupling between the first electrode and the third electrode increases in a case where the first coupler or the second coupler moves in a predetermined direction in which a degree of coupling between the second electrode and the fourth electrode decreases.

* * * * *